(12) United States Patent
Liu et al.

(10) Patent No.: US 6,216,131 B1
(45) Date of Patent: Apr. 10, 2001

(54) METHODS FOR MAPPING DATA FIELDS FROM ONE DATA SET TO ANOTHER IN A DATA PROCESSING ENVIRONMENT

(75) Inventors: Gwoho Liu, Santa Cruz; Eric O. Bodnar, Capitola; Philippe R. Kahn, Scotts Valley, all of CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/020,047

(22) Filed: Feb. 6, 1998

(51) Int. Cl.[7] .................................................. G06F 17/30
(52) U.S. Cl. ............................ 707/102; 707/6; 707/201
(58) Field of Search ................................. 707/100, 102, 707/6, 201

(56) References Cited

U.S. PATENT DOCUMENTS

| | | | |
|---|---|---|---|
| 4,769,796 | 9/1988 | Levine | 368/29 |
| 4,866,611 | 9/1989 | Cree et al. | 364/300 |
| 4,881,179 | 11/1989 | Vincent | 364/518 |
| 4,977,520 | 12/1990 | McCaughey, III et al. | 364/521 |
| 5,113,380 | 5/1992 | Levine | 368/10 |
| 5,224,212 | 6/1993 | Rosenthal et al. | 395/250 |
| 5,392,390 | * 2/1995 | Crozier | 395/161 |
| 5,442,783 | 8/1995 | Oswald et al. | 395/600 |
| 5,510,981 | * 4/1996 | Berger et al. | 364/419.02 |
| 5,519,606 | 5/1996 | Frid-Nielsen et al. | 364/401 |
| 5,666,553 | 9/1997 | Crozier | 395/803 |
| 5,684,990 | 11/1997 | Boothby | 395/619 |
| 5,701,423 | 12/1997 | Crozier | 395/335 |
| 5,708,828 | * 1/1998 | Coleman | 395/785 |
| 5,710,922 | 1/1998 | Alley et al. | 395/617 |
| 5,727,202 | 3/1998 | Kucala | 395/610 |
| 5,778,346 | 7/1998 | Frid-Nielsen et al. | 705/9 |
| 5,848,426 | * 12/1998 | Wang et al. | 707/505 |
| 5,862,325 | * 1/1999 | Reed et al. | 395/200.31 |
| 5,909,570 | * 6/1999 | Webber | 395/500 |

* cited by examiner

*Primary Examiner*—Wayne Amsbury
(74) *Attorney, Agent, or Firm*—John A. Smart

(57) ABSTRACT

A rule-based methodology is described which supports automatic mapping of data fields between different data sets in a data processing environment. If a field cannot be mapped or matched based on name alone (e.g., an identical match), the methodology employs rules to determine a type for the field, based on the field's name. The determined type of the field is then used for matching. The methodology can be employed to match fields which appear dissimilar phonetically but are otherwise appropriate for matching. In the currently-preferred embodiment, rules are stated in form of: regular expression=type. Here, the regular expression member lists the text strings or substring(s) for the field. The rules are ordered in descending preference according to the likelihood that a given rule will correctly identify a field. In this manner, the methodology allows the task of mapping fields from one data set to another to be entirely automated.

25 Claims, 13 Drawing Sheets

METHODS FOR MAPPING DATA FIELDS FROM ONE DATA SET TO ANOTHER IN A DATA PROCESSING ENVIRONMENT

BACKGROUND OF THE INVENTION

The present invention relates generally to the area of information processing and, more particularly, apparatus and methods for mapping or translating information from one data set to another.

Successful management of one's schedule and contacts is a goal that every successful professional must achieve. One's business day may be swept away in a deluge of meetings and appointments, all of which must be somehow managed. An attempt to manage this task on paper, such as with a simple wall calendar, is unworkable for all but the simplest of schedules. More likely, such unsophisticated aids to managing one's time will lead to scheduling conflicts, missed appointments, botched deadlines, and angry clients.

The first allies that professionals discovered were portable "organizers," such as the DayTimer™ or the Lafax™. However, an increasing number are discovering the power of personal computers for managing appointments, contacts, and "to do" tasks. For instance, several scheduling packages are available for the PC. While not as portable as paper organizers, scheduling packages offer increased flexibility in other areas. For example, one may view his or her schedule from a variety of views—by month, week, day, or priority—and attach detailed notes to appointments. Additional options available include the ability to automatically schedule a meeting for the first Monday of every other month, or display horizontal bars which graphically represent one's weekly schedule, so that free time can be quickly pinpointed. Other options include the ability to easily edit an entry, and set alarms as a reminder of important appointments.

With ever increasing emphasis on miniaturization and portability, several of the features of personal information management (PIM) packages may now be found in handheld information processing devices, such as the Sharp Wizard™, REX™, Casio BOSS™, and Palm Pilot™. Being roughly the size of a handheld calculator, these electronic organizers are often carried when one is away from the office. As a tradeoff for portability, however, these devices typically forego several of the more desirable features found on desktop personal computers (e.g., full color graphics display). As a result, it is common for a professional to employ a personal computer to manage his or her time, yet carry a portable organizer when he or she is away from the office. Upon returning to the office, the information in the personal computer is then updated with the new information in the portable organizer.

Updating or reconciling two sets of information, whether between a PC and an organizer, or between two computers joined by a communication network, has never been easy. The reconciliation of user scheduling and contact information has been particularly difficult. A particular problem faced by a user of information management programs is the difficulty of translating or mapping data fields from one device to those of another. Consider, for instance, a user device having the following source data fields:

First Name
Last Name
Street Address 1
Street Address 2
City
State
Zip Code
Phone
FAX Now, suppose the user also has a portable device with the following destination data fields:

First
Last
Home Address 1
Home Address 2
Home City
Home State
Home ZIP
Telephone
Telephone 2

As it can be seen, some of the fields are identical, others are somewhat similar, and finally still others are completely different.

A conventional approach to mapping fields between two devices is to display a user interface dialogue allowing the user to select pairs of fields. In such an approach, fields which are identical are already selected by the system, thereby leaving the user with some number of remaining fields to pair up. Such an approach works reasonably well if only a small number of fields are involved. Often, however, each set of data fields comprise a multitude of fields, hence making it very inconvenient for the user to manually match or pair up fields which are not identical, or at least very similar. A better approach is therefore desired.

What is needed is a system which allows a user of an information processing device to readily map or translate user information, such as user-supplied contact lists, from one data set on one device into another data set, either on the same device or on another device. The present invention fulfills this and other needs.

SUMMARY OF THE INVENTION

Computers have found a variety of applications for the management of one's time, including tracking meetings and appointments. With increased availability of portable information processing devices, many of the scheduling features found on personal computers are now available with handheld electronic organizers. Because handheld organizers sacrifice features for portability, professionals will often manage their time at the office with a personal computer, reserving the portable for when they are away. Upon returning to the office, however, one must reconcile the information stored in the portable with that already present in the personal computer. Often, there is a need to translate or map data fields from one device to those of another.

According to the present invention, improved rule-based methodology in a data processing environment is provided supporting automatic matching of data fields between different data sets, thus allowing the task of mapping fields from one data set to another to be entirely automated. If a field cannot be matched based on name alone (e.g., an identical match), the methodology of the present invention employs rules to determine a type for the field, based on the field's name. The determined type of the field is then used for matching. In this manner, the methodology can be employed to match fields which appear dissimilar phonetically but are otherwise appropriate for matching.

In the currently-preferred embodiment, rules are stated in the form of:

regular expression=type

Here, the regular expression member lists the text strings or substring(s) for the field. To support substring matching, the regular expression may contain *, <,> and ? characters, where matches any string, "<" and ">" match the beginning and ending of a word, respectively, and "?" matches any character, with matching being performed in a case insensitive manner. The type member consists of four or fewer characters (e.g., "name" for a name type), optionally preceded by a "–" character for indicating a "negative" type. A negative type indicates that the system should not map more than one field to a given field. The rules are ordered in descending preference according to the likelihood that a given rule will correctly identify a field. Alternatively, the rules may be ordered according to other desired criteria, or may be entirely unordered (i.e., a simple list).

A preferred user interface for mapping data fields from one device (e.g., desktop PC) to another (e.g., REX™ hand held device) is also provided. In accordance with the present invention, an exemplary system includes a TrueSync™ Wizard panel providing a "SmartMap"—that is, a mechanism whereby the system automatically detects and sets up mappings for each cardfile that the user selected to synchronize. By default, the system has already "smart mapped" the fields from source to destination. The user can override this mapping, as desired. If the user changes the default mappings and then want to restore them, he or she just clicks a SmartMap button. If preferred, the user can choose his or her own mappings by selecting a field in each column and clicking a Map button, or by clicking a field in the left column and then double-clicking a field in the right column to map it. To remove all mappings, the user clicks a Clear All Mappings button. To remove a particular field mapping, the user clicks a field in each column and then clicks an Umnap button.

After configuring the mapping, the user selects a Synchronize button, whereupon the system performs synchronization between two devices, according to the configuration information defined by the user. Data from source data fields is mapped according to the established mapping to corresponding data fields in the destination data set, with synchronization performed by the system.

DETAILED DESCRIPTION

General System Hardware and Software

Figure 1:
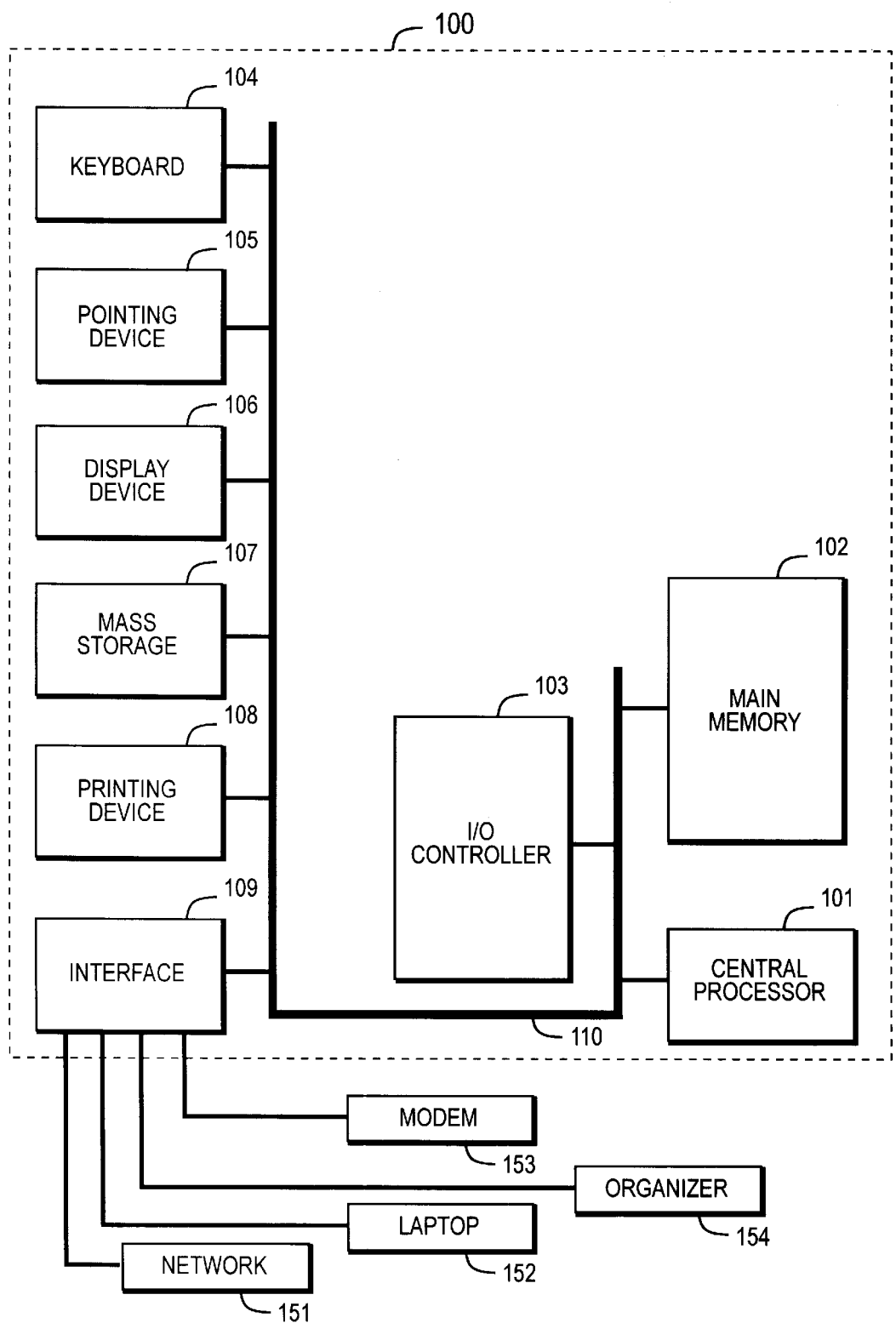
FIG. 1 is a block diagram of a computer system in which the present invention may be embodied.

The present invention may be embodied on an information processing system such as the system 100 of FIG. 1 which comprises a central processor 101, a main memory 102, an I/O controller 103, a keyboard 104, a pointing device 105 (e.g., mouse), a screen or display device 106, a mass storage 107, (e.g., hard disk), a printing device 108, and an interface 109. The various components of the system 100 communicate through a system bus 110 or similar architecture. In addition, the system 100 may communicate with other devices through the interface or communication port 109, which may be an RS-232 serial port or the like. Devices which will be commonly connected to the interface 109 include a network 151 (e.g., LANS), a laptop 152, a handheld organizer 154 (e.g., REX™, available from Franklin Electronic Publishers of Burlington, N.J.), a modem 153, and the like.

In operation, program logic (implementing the methodology described below) is loaded from the storage device or mass storage 107 into the main memory 102, for execution by the processor 101. During operation of the program (logic), the user enters commands through the keyboard 104 and/or pointing device 105 which is typically a mouse, a track ball, or the like. The computer system displays text and/or graphic images and other data on the display device 106, such as a cathode-ray tube or an LCD display. A hard copy of the displayed information, or other information within the system 100, may be obtained from the printing device 108. In a preferred embodiment, the computer system 100 is an IBM PC-compatible personal computer (available from a variety of vendors, including IBM of Armonk, New York) running Windows 9x or Windows NT (available from Microsoft Corporation of Redmond, Wash.).

In this interactive computer system, the user enters scheduling and other time information with the keyboard 104 and/or pointing device 105. Alternative sources of information are available through the interface 109. Once entered, the information is stored in the memory 102 where it may be analyzed by processor 101. After appropriate formatting, the information is conveyed to the user by the display device 106 and/or printing device 108. The information may be saved for future use by storing it to the mass storage 107.

Figure 2A:
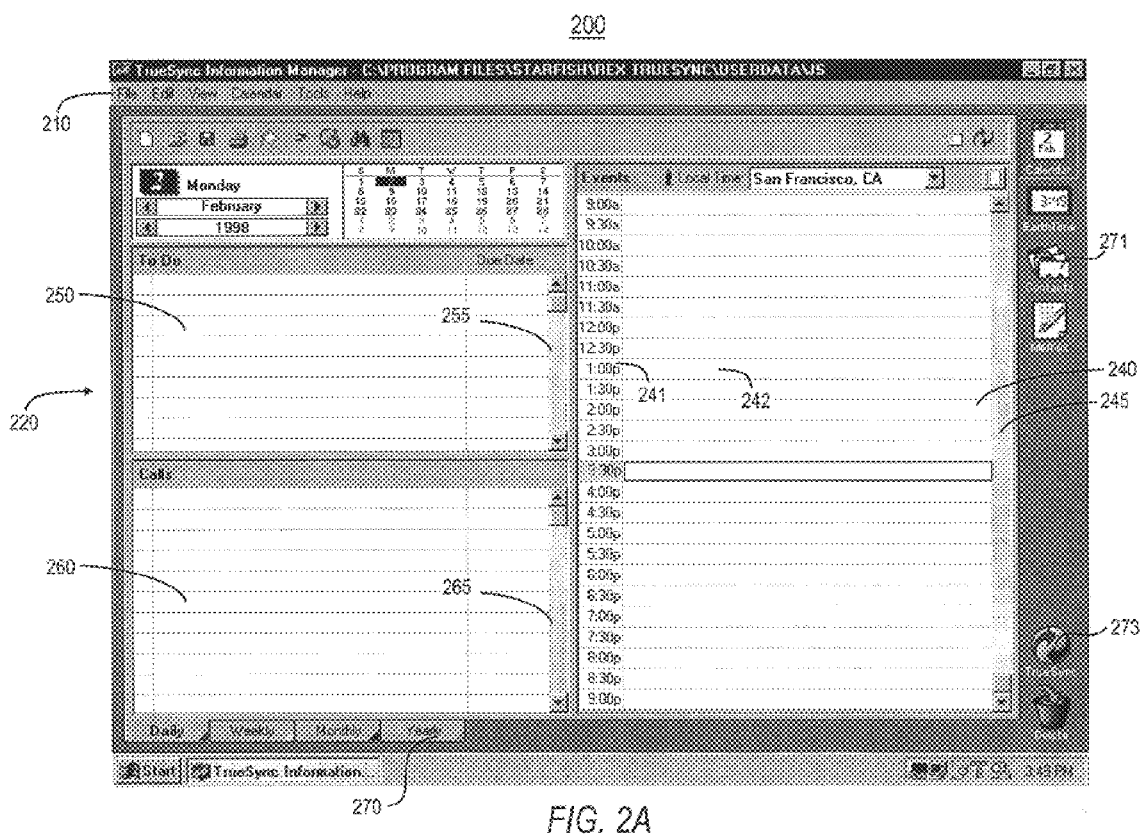
FIGS. 2A–C are bitmap screen shots illustrating a general desktop user interface for the personal information management system in which the present invention is embodied.

As shown in FIG. 2A, the system 100 provides a window or work space 200 for display on the screen 106. Window 200 is a rectangular, graphical user interface for viewing and manipulating textual and graphical information. Window 200 contains a main menu 210 for invoking a plurality of submenus. From the submenus, the user may select a desired choice with the keyboard 104 or the pointing device 105.

Window 200 also includes a client area 220 for the display of time, scheduling, and contact information. Client area 220 may be partitioned into individual modules of information, such as the scheduling window 240, to-do list window 250, and calls window 260. Additional information may be viewed in the windows 240, 250, 260 by activating scroll bars 245, 255, 265, respectively. Window 200 also includes a plurality of other virtual work surfaces (e.g., such as the Weekly view) which are accessible by selecting an appropriate tab 270 with the keyboard or pointing device.

Within the window 240, a plurality of fields is available for the display of event or scheduling information. For example, field 242 is a text field for indicating the nature of the scheduling event. Field 241, on the other hand, lists the start time associated with the event. As shown, field 241 lists start time at a user-selected interval, e.g., thirty minutes; in addition, irregular start times (those not falling exactly on the defined intervals) are also accommodated. Additional screen indicia, such as screen icons, colors, or particular fonts, may be employed to convey additional information, such as the setting of an alarm for an event.

Figure 2B:
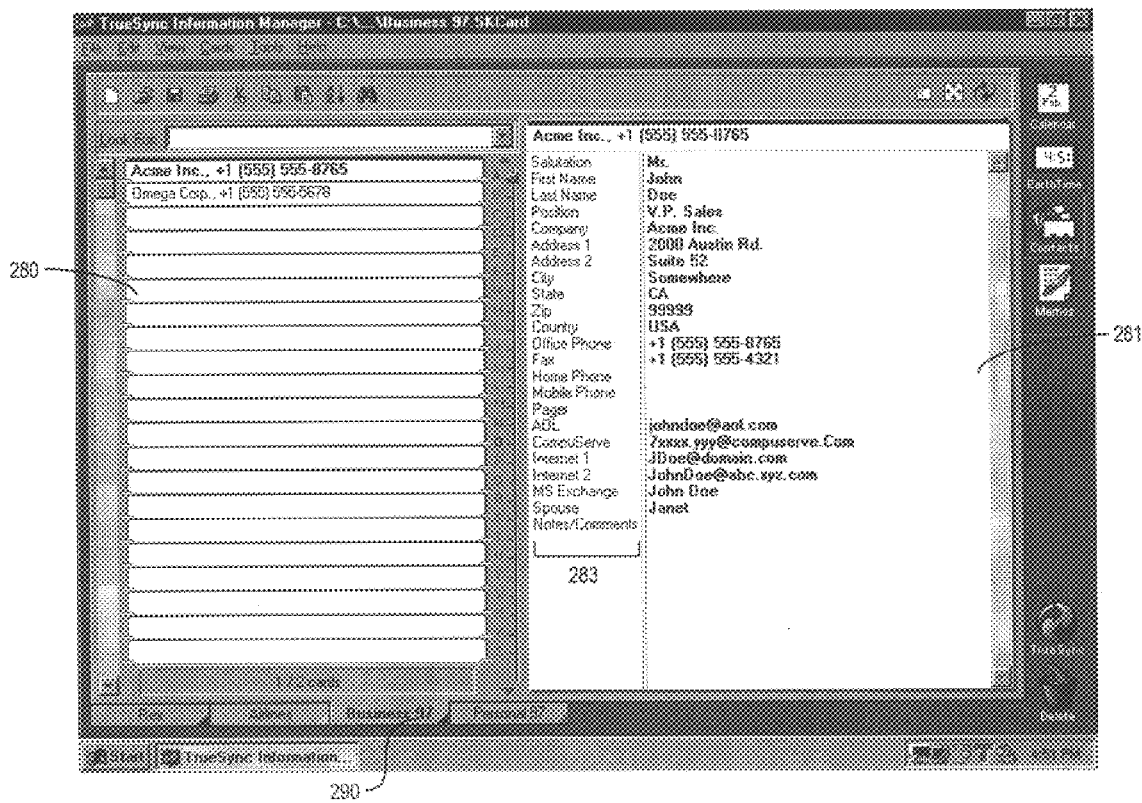
Figure 2C:
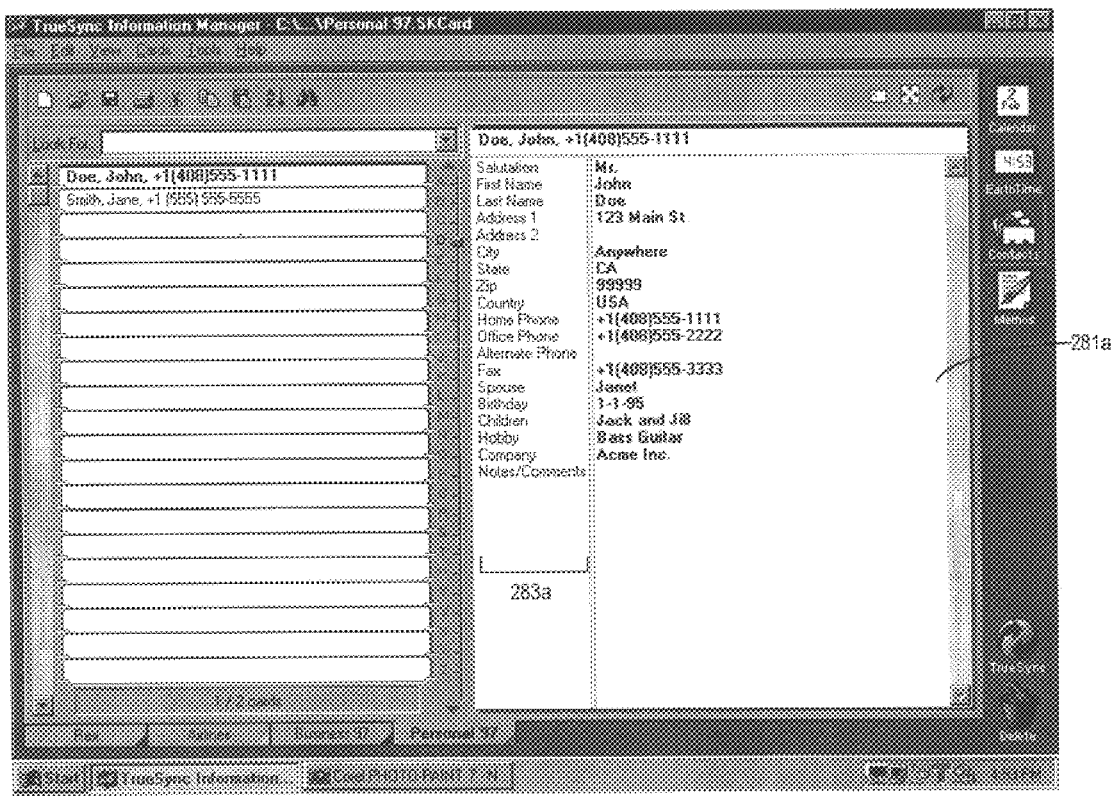

The interface 200 includes icons along one side, such as TrueSync icon 273 and Contacts icon 271. User selection of Contacts icon 271 invokes display of the Contacts work surface. As shown in FIG. 2B, the work surface includes pocketed index card view 280 and detail view 281. The detail view 281 displays data fields 283 for each card. Upon the user selecting a different card or information file, for example by selecting among tabs 290, the work surface displays a different cardfile 281 a in FIG. 2C having a different set of data fields 283a as shown in FIG. 2C. User selection of the TrueSync icon 273 invokes a synchronization process. Since mapping occurs prior to actual synchronization of user data, the mapping methodology of the present invention can be employed with a variety of synchronization techniques. In an exemplary embodiment, TrueSync synchronization is employed. For a detailed description of TrueSync synchronization, see commonly-owned patent application Ser. No. 08/923,612, filed Sep. 4, 1997, the disclosure of which is hereby incorporated by reference.

Preferred User Interface

The following description will focus on interface and techniques for mapping fields among disparate data sets in an electronic personal information management system. The present invention is, however, not limited to such a specific application but, instead, may be applied advantageously to map or translate a variety of table or set-oriented information. Thus, the following is offered for purposes of illustration and not limitation.

Figure 3A:
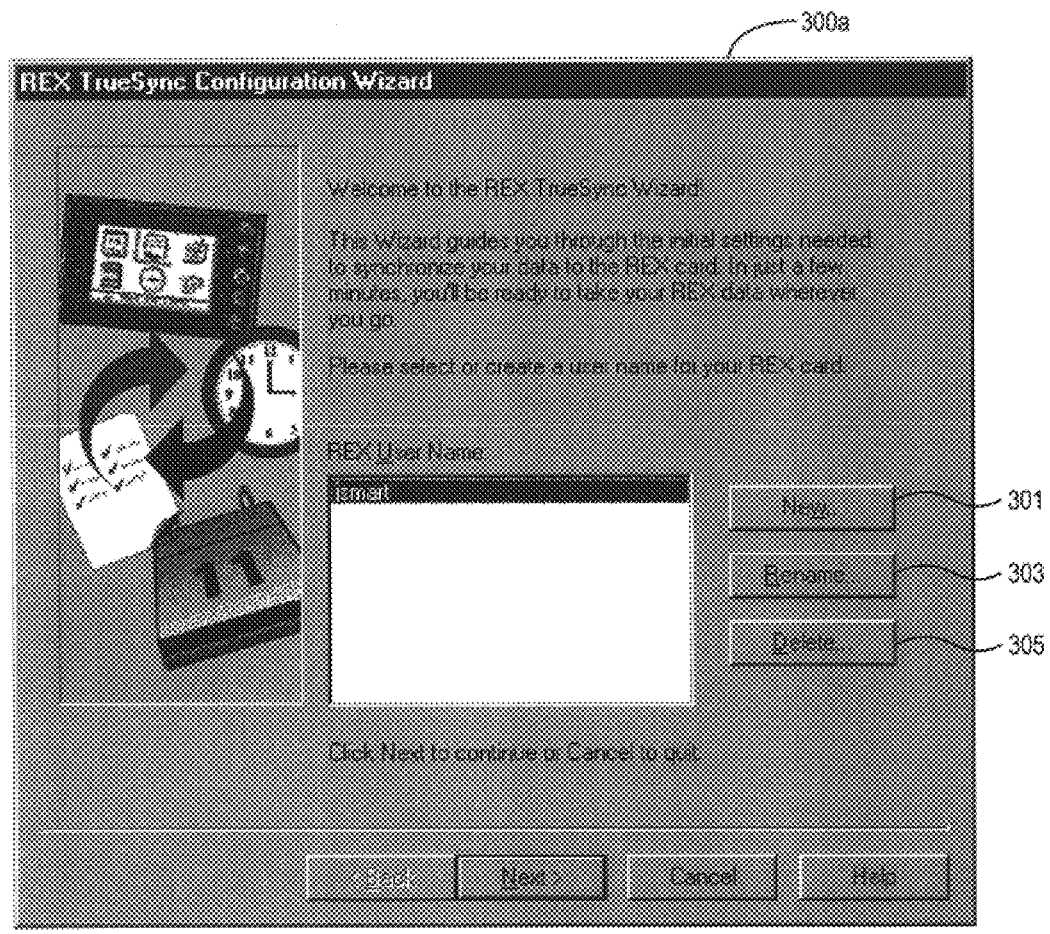
FIGS. 3A–G are bitmap screen shots illustrating a "wizard" user interface for configuring synchronization information in the system, wherein the interface includes a "smart mapping" wizard for automatically mapping data fields between source and destination data sets.

FIGS. 3A–G illustrate a preferred user interface for mapping data fields from one device (e.g., desktop PC) to another (e.g., REX™ hand held device). As shown in FIG. 3A, the system presents an opening Wizard panel 300a asking the user to enter a user name. This is used for storing configuration information. The (REX) User Name is the identification associated with a specific REX card. One can add additional user names to the list for individuals sharing the same Information Manager to synchronize to their own REX cards. To add another user name, the user clicks the New button 301. To change a name, the user selects the user name and clicks the Rename button 303. To remove a user, the user selects the user name and clicks the Delete button 305.

Figure 3B:
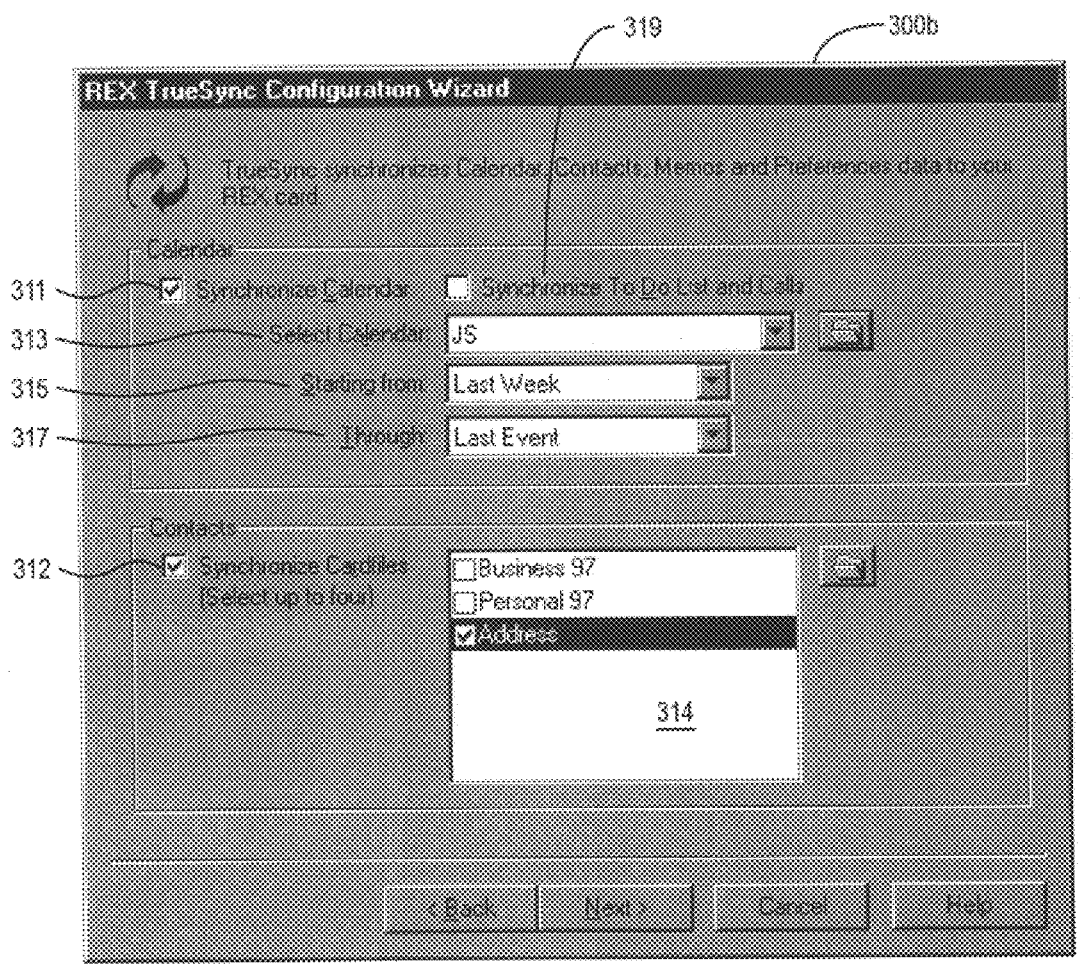

Next, in FIG. 3B, the system presents a Wizard panel 300b for selecting the Calendar and Contacts files the user wants to synchronize. The user can also synchronize To Do items and Calls. To synchronize calendar events, the user checks the Synchronize Calendar box 311. Single day, multi-day, special day, and recurring events will all be synchronized. To select the calendar file desired to be synchronized, the user employs the drop-down list 313. This list displays all user calendar files from the user's (REX) userdata folder. Thus, the user simply clicks the desired calendar file he or she wants to synchronize.

The Starting From date list 315 displays time period options from which to begin synchronization, such as: Today (from the beginning of the current day); This Month (from the beginning of the current month); and Last Week (from the beginning of last week). The current day on the user's computer is determined by the system date. The Through date list 317 gives the user time period options with which to end synchronization, such as: Next Week (through the end of the following week), and This Quarter (marked by January-March, April-June, July-September, October-December). The user's data will be synchronized through the end of the specified time period. To synchronize user To Do items and Calls, the user checks the Synchronize To Do List and Calls checkbox 319. Because To Do items and Calls are part of one's calendar in the Information Manager, they will be synchronized as a part of the Calendar file the user selected.

To synchronize Contacts information, the user checks the Synchronize Cardfiles box 312. To select the cardfile(s) the user wants to synchronize, he or she checks the box next to the desired cardfile(s) in the list 314, which displays all the cardfiles in one's REX userdata folder. To select a cardfile that is located in a different folder, the user clicks the accompanying Cardfiles Folder button, and selects the desired folder. The cardfiles contained in that folder will be added to the Select Cardfiles display list. The user can simply select the appropriate cardfile to synchronize.

Figure 3C:
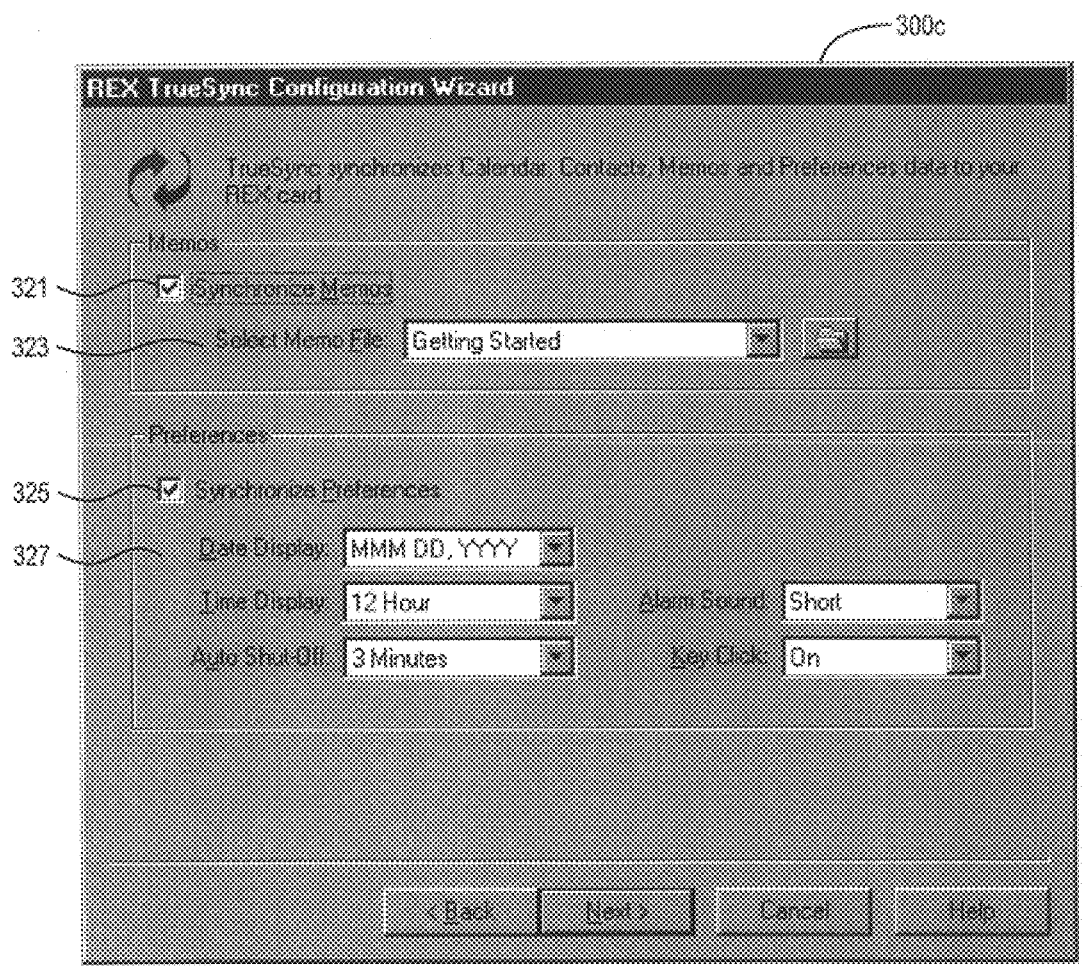
Figure 3D:
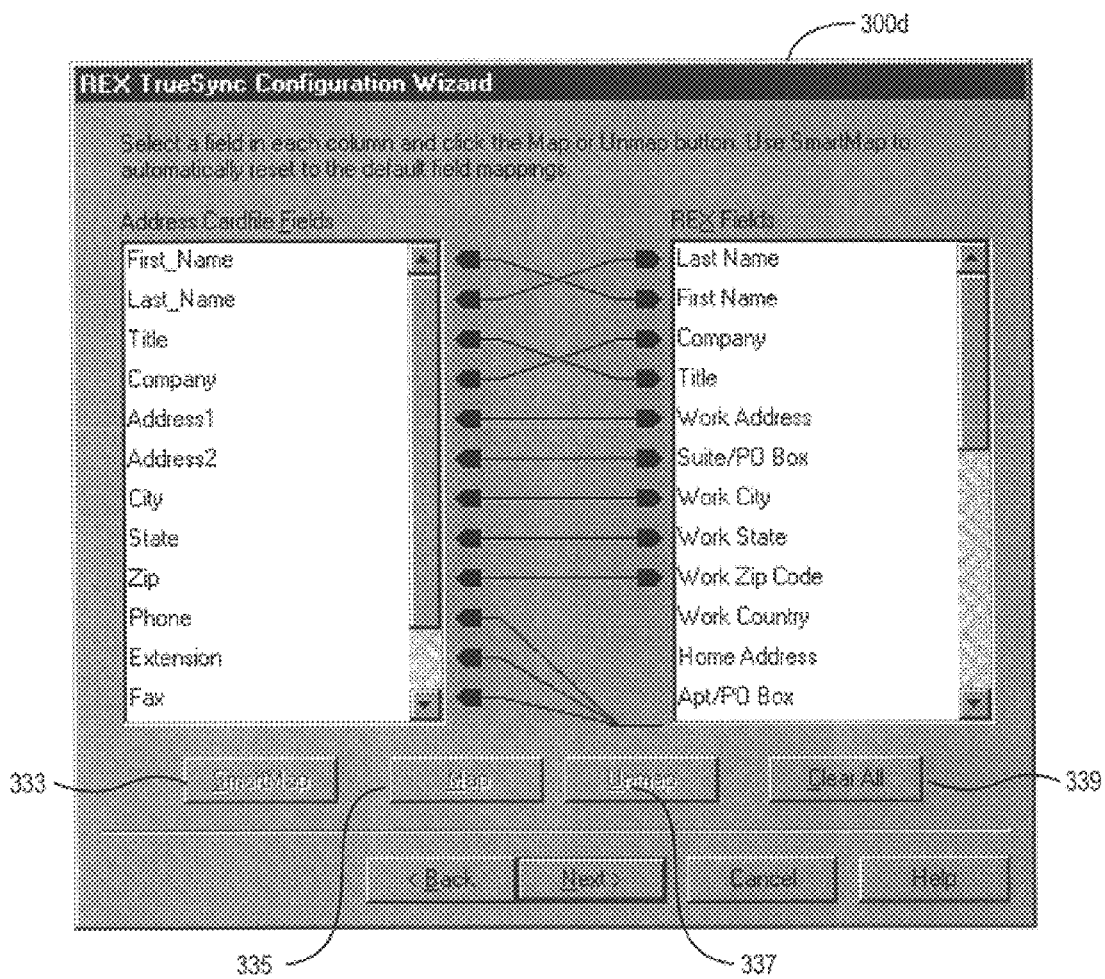

To synchronize Memos and Preferences, the user proceeds to the Wizard panel 300c, shown in FIG. 3C, to specify the Memos and Preferences information desired to be synchronized. To synchronize one's memos, the user checks the Synchronize Memos box 321. To select the memo file the user wants to synchronize, the user clicks the desired memo file in the drop-down list 323. This list displays all the memo files in one's REX userdata folder. If the user wants to select a memo file located in another folder, he or she clicks the accompanying Memos Folder button and selects the desired folder. The memo files contained in that folder will be added to the Select Memo File drop-down list. The user can simply select the appropriate memo file to synchronize.

To synchronize the current preferences settings to the user's REX card, the user checks the Synchronize Preferences box 325. The user can use the drop-down list 327 for each setting to change individual preferences:

Date Display: Click the arrow and select the format desired for the date display.

Time Display: Click the arrow and select 12-hour or 24-hour for the time display.

Auto Shut-Off Click the arrow and specify how long desired for the REX card to wait before shutting off automatically.

Alarm Sound: Click the arrow and specify whether a short alarm sound, a long alarm sound, or no alarm sound.

Key Click: Click the arrow and select whether the key click sound is on or off.

When the user selects the option to synchronize his or her cardfiles, the system will need to map cardfile fields to the fields on the user's REX card. In accordance with the present invention, the system includes a TrueSync Wizard panel 300d, shown in FIG. 3D, which provides a "SmartMap"—that is, a mechanism whereby the system automatically detects and sets up mappings for each cardfile that the user selected to synchronize. By default, the system has already "smart mapped" the fields from source to destination. The user can override this mapping, as desired. If the user changes the default mappings and then want to restore them, he or she just clicks the SmartMap button 333. If preferred, the user can choose his or her own mappings by selecting a field in each column and clicking the Map button 335, or by clicking a field in the left column and then double-clicking a field in the right column to map it. To remove all mappings, the user clicks Clear All Mappings 339. To remove a particular field mapping, the user clicks a field in each column and then clicks the Unmap button 337.

Figure 3E:
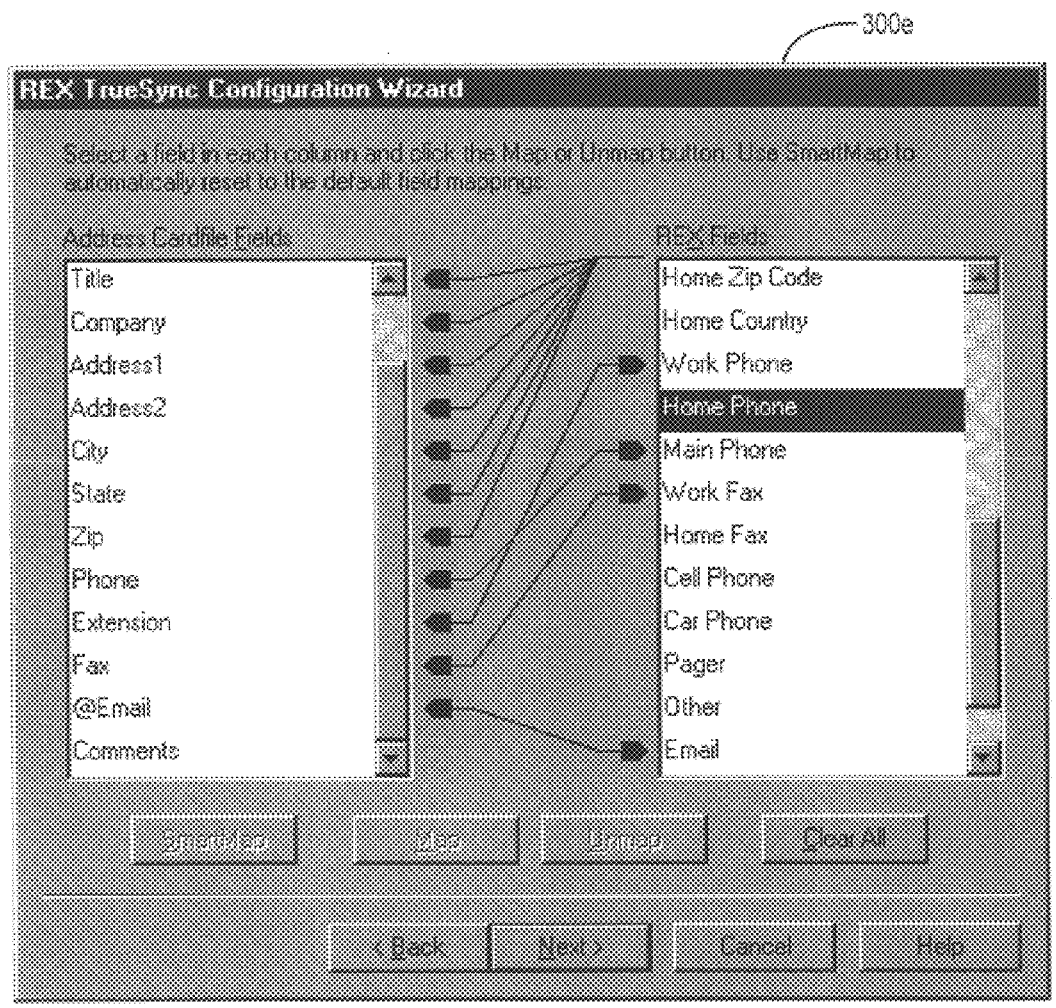

As shown, the system has smart mapped several fields from the source data set to the destination data set. For instance, the system has mapped "Last_Name" to "Last Name". More importantly for the user, the system has also automatically mapped several fields which are not so similar, but are otherwise appropriate. For instance, the fields of "Address 1" and "Address 2" have been mapped into "Work Address" and "Suite/PO Box", respectively. As shown in FIG. 3E for panel 300e, the system automatically mapped other fields to appropriate counterparts.

Figure 3F:
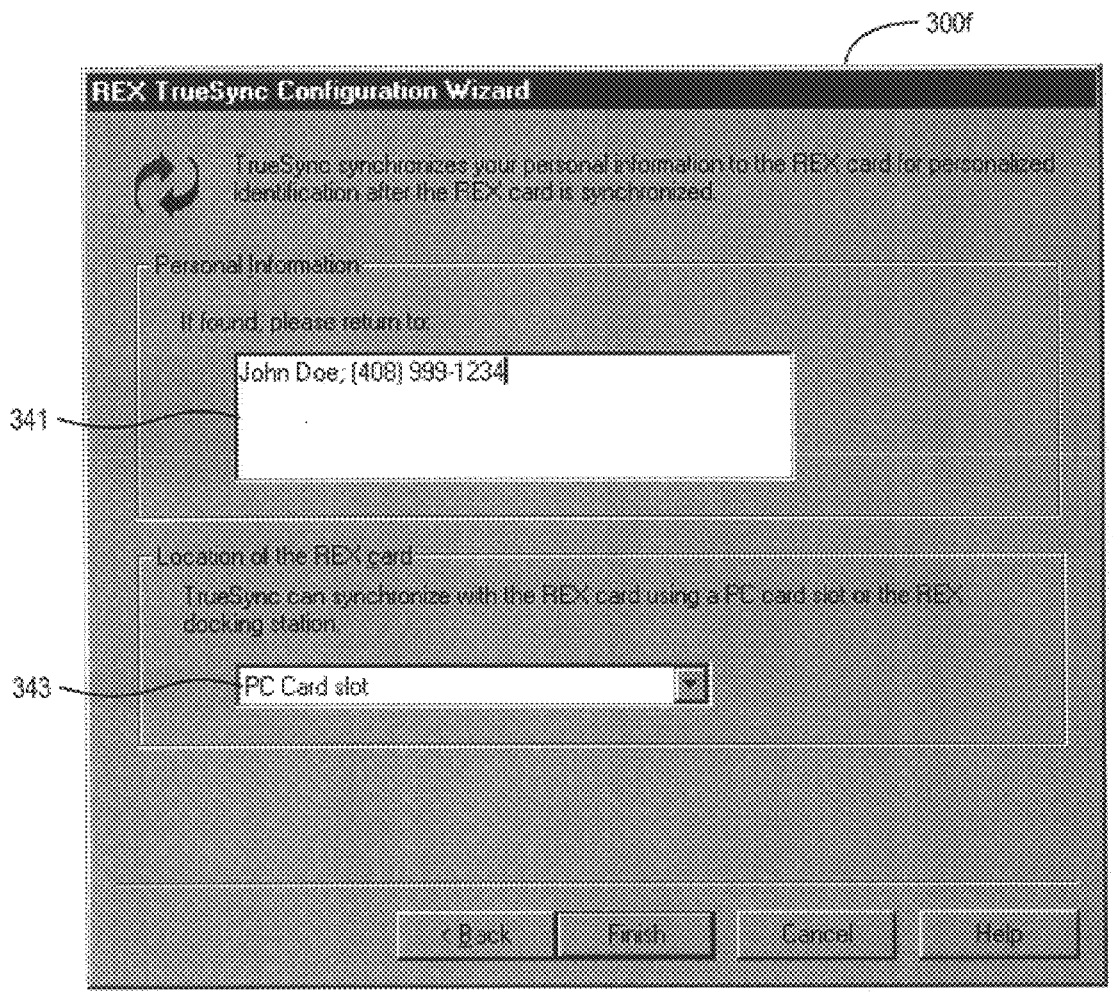

After the user is satisfied with the mapping, he or she proceeds to Wizard panel 300f, shown in FIG. 3F, to enter personal information that will help protect the user's REX card. Here, the user enters personal details 341, such as name, address and telephone number. The information serves as owner identification. These personal details are transferred to the REX card during synchronization. Dropdown list 343 is employed to select the location of the REX card for synchronization. By default, this is set to the PC card slot; alternatively, synchronization can be performed via a serial port.

Figure 3G:
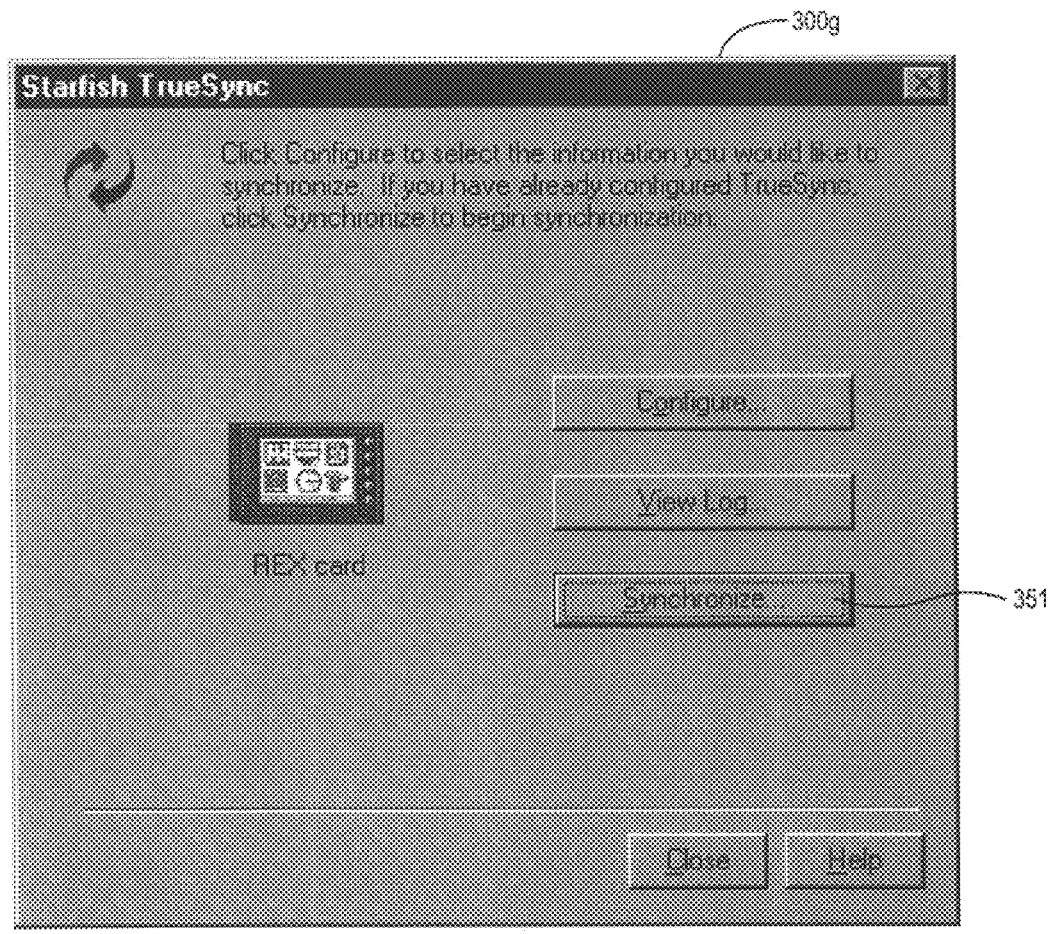

After completion of configuration, the user proceeds to the next Wizard panel 300g, as shown in FIG. 3G. Upon the user selecting the Synchronize button 351, the system performs synchronization between the two devices, according to the configuration information defined by the user. Data from source data fields is mapped according to the established mapping to corresponding data fields in the destination data set, with synchronization performed by the system. Since the mapping occurs prior to actual synchronization of the data, the mapping methodology can be employed with a variety of synchronization techniques.

Internal Operation

According to the present invention, improved rule-based methodology is provided supporting automatic matching of data fields between different data sets, thus allowing the task of mapping fields from one data set to another to be entirely automated. If a field cannot be matched based on name alone (e.g., an identical match), the methodology of the present invention employs rules to determine a type for the field, based on the field's name. The determined type of the field is then used for matching. In this manner, the methodology can be employed to match fields which appear dissimilar phonetically but are otherwise appropriate for matching.

In the currently-preferred embodiment, rules are stated in the form of:

regular expression=type

Here, the regular expression member lists the text strings or substring(s) for the field. To support substring matching, the regular expression may contain *, <,> and ? characters, where "*" matches any string, "<" and ">" match beginning and end of word, respectively, and "?" matches any character, with matching being performed in a case insensitive manner. The type member consists of four or fewer characters (e.g., "name" for a name type), optionally preceeded by a "−" character for indicating a "negative" type. A negative type indicates that the system should not map more than one field to given field. The rules are ordered in descending preference according to the likelihood that a given rule will correctly identify a field. This is perhaps best illustrated by way of example.

In a user data set from a personal information manager, the most likely type of data field is name—that is, a field type storing some sort of name information. In the system of the present invention, therefore, a first set of rules is established for mapping name-related fields, specifically the last name field and the first name field (if any). The rules are as follows.

last=−name
    name=−name
    *<last>*<name>*=−name
    *<lastname>*=−name
    *<first>*<name>*=−firs
    *<firstname>*=−firs Here, a field named "last", "name", or substring combinations thereof (i.e., rule of *<last>*<name>* or *<lastname>*) is determined to be of type name. Since this type is a "negative" type, the system will not map this field more than one time. Similarly, a field named "first" or substring combinations of "first" and "name" (i.e., rule of *<first>*<name>* or *<firstname>*) is determined to be of type firs (i.e., "first name" type). Again, since this type is a "negative" type, the system will not map this field more than one time.

Next, a set of rules is established for mapping phone-related fields. These are divided into the following types of phones: home (i.e., home phone), main (i.e., main phone), and other (i.e., other phone). The rules are as follows.

*<home*phone>*=home
    *<house*phone>*=home
    *<personal*phone>*=home
    *<private*phone>*=home
    *<main*phone>*=main
    *<primary*phone>*=main
    *<work*phone>*=main
    *<business*phone>*=main
    *<other*phone>*=othe
    *<assistant*phone>*=othe
    *<altern*phone>*=othe
    *2*<phone>*=othe
    *3*<phone>*=othe
    *<phone>*2*=othe
    *<phone>*3*=othe As shown, any field having string or substring combinations of "home", "house", "personal", or "private" with "phone", will be determined to be of type home (i.e., home phone). In a like manner, any field having string or substring combinations of "main", "primary", "work", or "business" with "phone", will be determined to be of type main (i.e., main phone). Finally, other string or substring combinations with "phone" are determined to be of type othe (i.e., other phone), in the manner indicated above.

E-mail fields can be handled in a similar fashion by defining the following set of rules.

*<compuserv*=emai
    *<m*<exchange>*=emai
    *<eudora>*=emai
    *<aol>*=emai
    *<e*<mail>*=emai
    *<net*<mail>*=emai
    *<web>*<mail>*=emai
    *<computer>*<mail>*=emai
    *<pc>*<mail>*=emai Note that the system of the present invention can match up a field entitled "CompuServe" (i.e., having the substring compuserv) as an e-mail field type (i.e., type=emai), despite the fact that the word "CompuServe" is phonetically unrelated to "e-mail". In a similar manner, the system can match up other seemingly unrelated fields as e-mail fields, including AOL (rule: *<aol>*), Microsoft Exchange (rule: *<m*<exchange>*), and Eudora (rule: *<eudora>*), among others.

Perhaps the most troublesome data fields to handle are those involving address-type information. This is due to the seemingly endless number of ways that one can represent address information. Further complicating this process is the occurrence of separate home and work address information. The present invention defines a set of address rules as follows.

```
*<home>*<street>*2*=-had2
*<home>*<street>*<two>*=-had2
*<home>*<addr*2*=-had2
*<home>*<addr*<two>*=-had2
*<home>*<unit>*=-had2
*<home>*<po>*=-had2
*<home>*<p.o>*=-had2
*<home>*<p. o>*=-had2
*<home>*<p o>*=-had2
*<home>*<post*office>*=-had2
*<apt>*=-had2
*<apart*=-had2
*<home>*<street>*=-had1
*<home>*<addr*=-had1
*<home>*<town>*=-hcit
*<home>*<village>*=-hcit
*<home>*<city>*=-hcit
*<home>*<province>*=-hsta
*<home>*<district>*=-hsta
*<home>*<state>*=-hsta
*<home>*<zip*=-hzip
*<home>*<postal*=-hzip
*<home>*<country>*=-hcou
*<home>*<nation>*=-hcou
*<home>*<common *wealth>*=-hcou
*<home>*<territory>*=-hcou

*<street>*2 *<home>*=-had2
*<street>*<two>*<home>*=-had2
*<addr*2*<home>*=-had2
*<addr*<two>*<home>*=-had2
*<unit>*<home>*=-had2
*<po>*<home>*=-had2
*<p.o>*<home>*=-had2
*<p. o>*<home>*=-had2
*<p o>*<home>*=-had2
*<post*office>*<home>*=-had2
*<street>*<home>*=-had1
*<addr*<home>*=-had1
*<town>*<home>*=-hcit
*<village>*<home>*=-hcit
*<city>*<home>*=-hcit
*<province>*<home>*=-hsta
*<district>*<home>*=-hsta
*<state>*<home>*=-hsta
*<Zip*<home>*=-hzip
*<postal*<home>*=-hzip
*<country>*<home>*=-hcou
*<nation>*<home>*=-hcou
*<common *wealth>*<home>*=-hcou
*<territory>*<home>*=-hcou

*<street>*2 *=-wad2
*<street>*<two>*=-wad2
*<addr*2*=-wad2
*<addr*<two>*=-wad2
*<po>*=-wad2
*<p.o>*=-wad2
*<p. o>*=-wad2
*<p o>*=-wad2
*<post*office>*=-wad2
*<suite>*=-wad2
*<street>*=-wad1
*<department>*=-wad2
*<dept>*=-wad2
*<addr*=-wad1
*<unit>*=-wad1
*<town>*=-wcit
*<village>*=-wcit
*<city>*=-wcit
*<province>*=-wsta
*<district>*=-wsta
*<state>*=-wsta
*<Zip*=-wzip
*<postal*=-wzip
*<country>*=-wcou
*<nation>*=-wcou
*<common *wealth>*=-wcou
*<territory>*=-wcou
```

As shown, addressing information is divided into "home" and "work" types. Within those types, subtypes appear, such as a home city (hcit), home state (hsta), and home zip code (hzip). In this manner, the system can appropriately map address information into home and/or work address fields on a target device.

Figure 4:
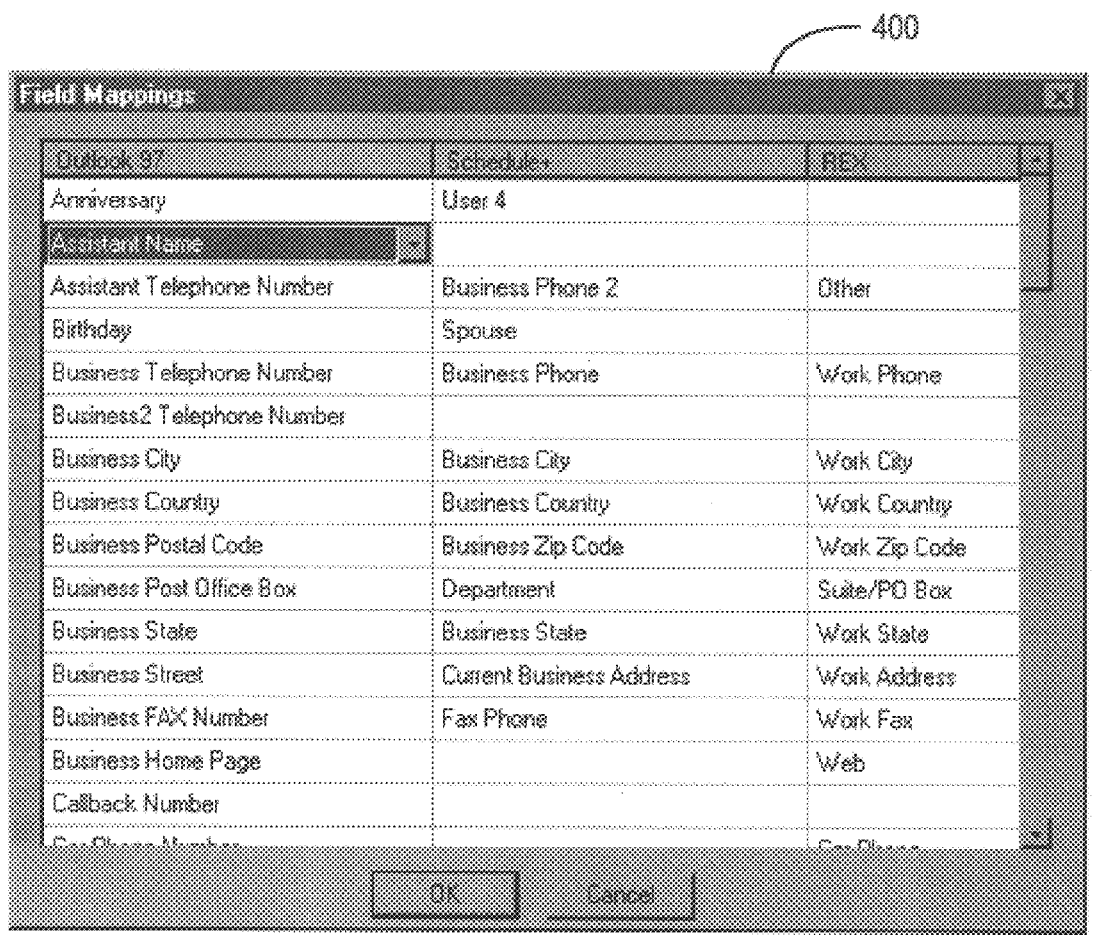
FIG. 4 is a bitmap screen shot illustrating a configuration table for configuring a plurality of devices such that the methodology of the present invention can be extended to map between any arbitrary number of devices.

Although the foregoing example has focused on the currently preferred embodiment of mapping between multiple devices (e.g., PIMs running on PCs) to a single device (e.g., REX device), the methodology of the present invention can be modified to map between any arbitrary number of devices. This is illustrated by table 400 in FIG. 4. As shown, the table includes field mapping rules for three separate devices. Here, any device in the table can map to any other device in the table. The approach works better when synchronizing data between a number of PIMs, but provides less specificity for mapping data fields to a specific device. In an embodiment targeting mapping to a single device, therefore, the linear or single mapping approach (previously described) is preferred.

Figure 5:
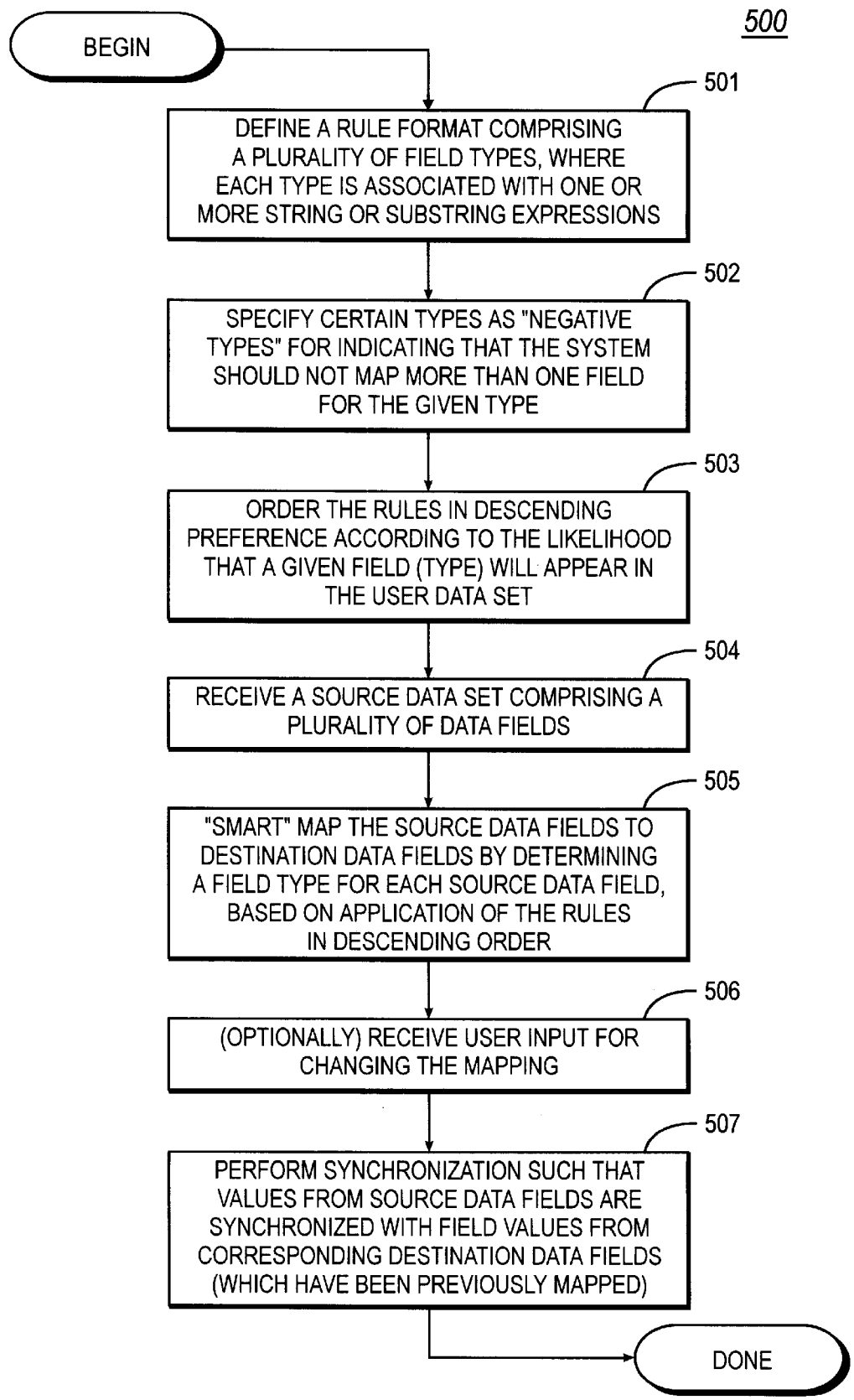
FIG. 5 is a flow chart illustrating general methodology of the present invention for mapping data fields from one data set to another in a data processing system or environment.

Referring to FIG. 5, flow chart 500 summarizes the overall methodology of the present invention for mapping data fields from one data set to another in a data processing system or environment. At step 501, a rule format is defined comprising a plurality of field types, where each type is associated with one or more string or substring expressions. At step 502, certain types are specified as "negative types" for indicating that the system should not map more than one field for the given type. At step 503, the rules are ordered in descending preference according to the likelihood that a given rule will correctly identify a field. Alternatively, the rules may be ordered according to other desired criteria, or may be entirely unordered (i.e., a simple list). At step 504, a source data set comprising a plurality of data fields is received. At step 505, the source data fields are "smart" mapped to destination data fields by determining a field type for each source data field, based on application of the rules in descending order. At step 506, the system can (optionally) receive user input for changing the mapping. Finally, at step 507, the system performs synchronization, such that values from source data fields are synchronized with field values from corresponding destination data fields (which have been previously mapped).

Source Code Implementation

Appended herewith as Appendix A is a source code listing illustrating program logic for matching expressions in accordance with the present invention. A suitable C/C++ compiler for compiling the source code is available from a variety of vendors, including Microsoft of Redmond, Washington and Borland International of Scotts Valley, Calif. Appended herewith as Appendix B is a data file illustrating expressions for mapping fields in an exemplary embodiment in which data fields are mapped for synchronizing from a (number of) PIM(s) to a fixed PIM, such as the REXTM PC Companion.

While the invention is described in some detail with specific reference to a single preferred embodiment and certain alternatives, there is no intent to limit the invention to that particular embodiment or those specific alternatives. For example, those skilled in the art, enabled by the teachings of the present invention, will understand that the list of rules may be ordered according to other criteria, or may be entirely unordered. The true scope of the invention is defined not by the foregoing description but by the appended claims.

What is claimed is:

1. In a data processing system, a method for mapping data fields from a source data set to a destination data set, in the method comprising:

defining a set of rules comprising a plurality of field types, wherein each field type is associated with one or more string or substring expressions specifying a field name for facilitating data field mapping without user intervention;

ordering said rules according to how likely a given rule will correctly identify a field;

receiving a source data set comprising a plurality of data fields;

without requiring user intervention, mapping data fields of the source data set to data fields of the destination data set by determining a field type for each source data field, based on application of the rules; and synchronizing the source data set with the destination data set, so that values from data fields of the source data set are synchronized with field values from corresponding data fields of the destination data set.

2. The method of claim 1, wherein said rules are ordered in descending preference, according to how likely a given rule will correctly identify a field.

3. The method of claim 1, wherein each rule is stored in the system in the form of:

regular expression=type wherein said regular expression comprises at least one text substring describing a particular field.

4. The method of claim 3, wherein said at least one text substring includes wild card characters for matching text strings having unknown characters.

5. The method of claim 4, wherein said wild card characters comprise *, <,> and ? characters, where "*" matches any string, "<" and ">" match the beginning and ending of a word, respectively, and "?" matches any character.

6. The method of claim 5, wherein matching occurs in a case insensitive fashion.

7. The method of claim 1, wherein said plurality of field types includes at least one negative field type, for indicating that the system should not map more than one data field of the source data set for a particular field type.

8. The method of claim 1, further comprising:

receiving input for changing mapping of at least one data field from that which has been automatically selected by the system.

9. The method of claim 1, further comprising:

displaying a dialogue indicating how data fields are mapped between the source data set and the destination data set.

10. The method of claim 9, further comprising:

receiving at the dialogue user input for changing mapping of at least one data field from that which has been automatically selected by the system; and in response to said user input, updating display of the dialogue for showing the user-specified mapping.

11. A data processing system providing automatic mapping of data fields from one data set to another comprising:

a computer capable of storing and processing a source data set and a destination data set;

means for storing a set of rules comprising a plurality of field types, wherein each field type is associated with a particular type of field usually present in user data for facilitating data field mapping without user intervention;

means for ordering said rules according to how likely a given rule will correctly identify a field;

means for mapping data fields of the source data set to data fields of the destination data set without user intervention by associating each data field of the source data set with a corresponding data field of the destination data set, based on a field type determined for each data field from application of the rules; and means for synchronizing the source data set with the destination data set, so that values from data fields of the source data set are synchronized with field values from associated data fields of the destination data set.

12. The system of claim 11, wherein said rules are ordered in descending preference, according to how likely a given rule will correctly identify a field.

13. The system of claim 11, wherein each rule is stored in the system in the form of:

regular expression=type wherein said regular expression comprises at least one text substring describing a particular field.

14. The system of claim 13, wherein said at least one text substring includes wild card characters for matching text strings having unknown characters.

15. The system of claim 14, wherein said wild card characters comprise *, <, > and ? characters, where "*" matches any string, "<" and ">" match the beginning and ending of a word, respectively, and "?" matches any character.

16. The system of claim 15, wherein matching is performed by the system in a case insensitive fashion.

17. The system of claim 11, wherein said plurality of field types includes at least one negative field type, for indicating that the system should not map more than one data field of the source data set for a particular field type.

18. The system of claim 11, further comprising:

input means for changing mapping of at least one data field from that which has been automatically selected by the system.

19. The system of claim 11, further comprising:

means for displaying a dialogue indicating how data fields are mapped between the source data set and the destination data set.

20. The system of claim 19, further comprising:

means for receiving at the dialogue user input for changing mapping of at least one data field from that which has been automatically selected by the system; and means, responsive to said user input, for updating display of the dialogue for showing the user-specified mapping.

21. A storage device storing a computer program providing methodology for automatic mapping of data fields among multiple devices, the computer program comprising:

program steps for storing mapping rules specifying how each field type present in a source data set is to be mapped into a destination data set for facilitating data field mapping without user intervention, wherein each field type is associated with a particular type of data field usually present in user data;

program steps for ordering said rules according to how likely a given rule will correctly identify a field; and program steps for mapping data fields of the source data set to data fields of the destination data set without user intervention by associating, based on said mapping rules, each data field of the source data set with a corresponding data field of the destination data set, so that during synchronization of the source data set with the destination data set, values from data fields of the source data set are synchronized with values from associated data fields of the destination data set.

22. The storage device of claim 21, wherein said mapping rules are stored in the form of:

regular expression=type wherein said regular expression comprises at least one text substring matching a name of a particular data field.

23. The storage device of claim 21, wherein said mapping rules for a plurality of devices are stored in a table, such that each row of the table specifies a mapping rule for a particular type of data field present among the multiple devices.

24. The storage device of claim 23, wherein each mapping rule comprises a text expression suitable for determining a type of data field based on the data field's name.

25. The storage device of claim 24, wherein said text expression comprises at least one text substring correlating to an expected name for a particular type of data field.

\* \* \* \* \*